United States Patent [19]
Nobusawa

[11] 3,994,595
[45] Nov. 30, 1976

[54] SYSTEMS FOR STATICALLY DETERMINING BRIGHTNESS CHARACTERISTICS OF AN AREA TO BE PHOTOGRAPHED

[75] Inventor: Tsukumo Nobusawa, Tokyo, Japan

[73] Assignee: Asahi Kogaku Kogyo Kabushiki Kaisha, Japan

[22] Filed: July 22, 1974

[21] Appl. No.: 491,148

Related U.S. Application Data

[63] Continuation-in-part of Ser. No. 456,380, March 29, 1974, Pat. No. 3,945,732, and a continuation-in-part of Ser. No. 483,711, June 27, 1974.

[30] Foreign Application Priority Data

July 23, 1973 Japan.............................. 48-80901
Sept. 26, 1973 Japan............................ 48-107617

[52] U.S. Cl.............................. 356/222; 356/226; 356/227; 354/31
[51] Int. Cl.$^2$ ...................... G01J 1/42; G03B 7/08
[58] Field of Search.................. 356/226, 222, 227; 354/31

[56] References Cited

UNITED STATES PATENTS

| | | | |
|---|---|---|---|
| 3,436,158 | 4/1969 | Schmitt.............................. | 356/226 |
| 3,772,517 | 11/1973 | Smith................................. | 356/226 |

*Primary Examiner*—John K. Corbin
*Assistant Examiner*—Conrad Clark
*Attorney, Agent, or Firm*—Steinberg & Blake

[57] ABSTRACT

A system for detecting the brightness of an area which is to be photographed. A plurality of series circuits respectively include a plurality of photosensitive devices for respectively receiving light from different parts of the area while remaining substantially static with respect thereto so that when the area is illuminated unevenly a pair of the photosensitive devices will respectively receive light of maximum and minimum brightness. The plurality of series circuits respectively include also a plurality of series-connected elements respectively connected in series with the plurality of photosensitive devices for respectively providing therewith a plurality of photo-responsive divided voltages. The plurality of series circuits are connected in parallel with each other and with a power source. A reference voltage unit provides between given upper and lower limits a reference voltage progressing between these limits, this reference voltage means including at least one variable resistor and also being connected in parallel with the plurality of series circuits. A comparing circuit is electrically connected between the plurality of series circuits and the reference voltage unit for comparing the photo-responsive voltages with the reference voltage, with an indicator means being provided to indicate when one of the above pair of photosensitive devices provides a photo-responsive voltage having a predetermined relationship with respect to the reference voltage.

14 Claims, 14 Drawing Figures

SYSTEMS FOR STATICALLY DETERMINING BRIGHTNESS CHARACTERISTICS OF AN AREA TO BE PHOTOGRAPHED

CROSS REFERENCE TO RELATED APPLICATIONS

This application is a continuation-in-part of application Ser. No. 456,380 filed Mar. 29, 1974 and entitled Light-Measuring Systems now U.S. Pat. No. 3,945,732 and application Ser. No. 483,711, filed June 27, 1974 and entitled Systems for Responding to Non-Uniform Scene Brightness.

BACKGROUND OF THE INVENTION

The present invention relates to light-measuring systems.

Thus, the present invention relates to systems which may be used as exposure meters in connection with photography, such exposure meters either forming separate units or being incorporated into and forming part of a camera.

As is well known, areas which are to be photographed often are unevenly illuminated so that part of the area to be photographed has a maximum brightness while another part has a minimum brightness. At the present time in order to scan such areas with conventional light-measuring systems it is necessary for the operator to swing or otherwise move the light-responsive structure so that it will pick up the light of different brightness coming from different parts of a given area which is to be photographed. Such operations represent a considerable inconvenience not only because of the scanning movement which the operator must carry out but also because of the time required for such an operation and the necessity of the operator to detect where the maximum and/or minimum brightness of a given scene are located.

It has already been proposed to avoid the above drawbacks by providing a system which can remain stationary while detecting maximum and/or minimum brightness of a given area which is to be photographed, so that it becomes possible to determine statically the maximum and/or minimum brightness or the range of brightness therebetween.

It is well known that in ordinary photography an exposure must be well defined within a density curve of the particular film which is being exposed so that in order to obtain a photograph of good tone, consideration must be given to the relationship between the range of brightness of the object to be photographed and the density curve of the film.

Up to the present time there has been no satisfactory system for taking into consideration the variable brightness of a given area which is to be photographed as it relates to the density curve of the film which is exposed. Some extremely careful photographers who are particularly concerned with these factors use the so-called spot-exposure meters for determining the brightness of selected parts of the area to be photographed and then provide suitable camera adjustments taking into consideration readings from the different parts of the area which is to be photographed in connection with the density curve of the film. However, these operations are extremely inconvenient in that it is essential for the operator, as when the light-measuring system is incorporated into a camera, to view different parts of the scene or area which is to be photographed in the viewfinder taking into consideration the different brightness values which are provided in this way and then providing suitable camera settings. Such inconvenient and time-consuming operations may give satisfactory results with respect to a stationary object which is to be photographed, assuming that the lighting conditions remain substantially unchanged long enough to provide for a meaningful reading of the different light intensities from different parts of the object, but of course when photographing a moving object it is impossible to carry out these careful operations and often the opportunity for making a highly desirable photograph is missed because of the tedious operations presently required as set forth above.

SUMMARY OF THE INVENTION

It is accordingly a primary object of the present invention to provide a light-measuring system which will avoid the above drawbacks.

In particular, it is an object of the present invention to provide a light-measuring system which enables the light of maximum or minimum brightness not only to be statically determined but also to be compared with a reference voltage for achieving an extremely accurate determination of the brightness characteristics so as to provide the best possible photograph in a highly convenient and rapid manner.

It is furthermore an object of the present invention to provide a system of the above type which can be either manually operated to achieve the scanning or reference voltage or which may be driven to provide the scanning or reference voltage.

Furthermore, it is an object of the present invention to provide a system capable of being used by amateur photographers in connection with simple snapshots so as to achieve an extremely high quality even in casual photographs made by amateurs who otherwise would not bother with the procedures which are conventionally required as set forth above.

Furthermore, it is an object of the present invention to provide a light-measuring system of the above type which can be used either for indicating to the operator the maximum or minimum brightness, or both, or which may be used for automatically setting a camera to achieve a high quality photograph in a fully automatic manner.

According to the present invention the system for detecting the brightness of an area which is to be photographed includes a plurality of series circuits which respectively include a plurality of photosensitive means for respectively receiving light from different parts of the area while remaining substantially static with respect thereto so that when the area is illuminated unevenly a pair of the photosensitive means will respectively receive light of maximum and minimum brightness. The plurality of series circuits respectively include also a plurality of series-connected means respectively connected in series with the plurality of photosensitive means for respectively providing therewith junctions between the plurality of photosensitive means and the series-connected means electrically connected thereto a plurality of photo-responsive divided voltages. A power source is connected in parallel with the plurality of series circuits which are also connected in parallel with each other. A reference voltage means provides between given upper and lower limits a reference voltage which progresses away from one and toward the other of these limits, this reference voltage means comprising a pair of series-connected components at least one of which is a variable resistor and including between these components a junction at which the reference voltage appears. This reference voltage means is also connected in parallel with the power source and the plurality of series circuits. A comparing circuit means electrically connects the junction between the series-connected components of the reference voltage means with the junctions of the plurality of series circuits for comparing the reference voltage with the plurality of photo-responsive voltages. An indicator means electrically connected with the reference voltage means indicates when the reference voltage has a predetermined relationship with respect to the photo-responsive voltage derived from one of the above pair of photosensitive means and the series-connected means electrically connected therewith.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
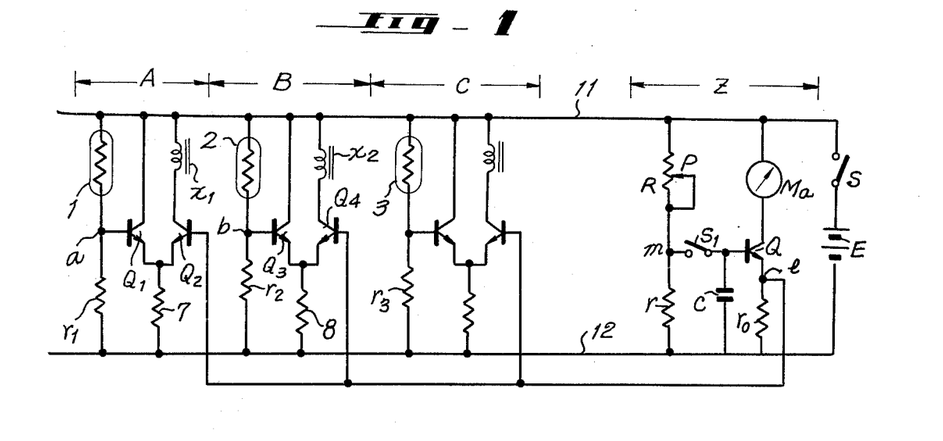
FIG. 1 is a schematic wiring diagram of one possible embodiment of a system according to the present invention.

Referring first to FIG. 1, the circuit sections A, B, C, etc. are respectively sections for detecting the brightness of different parts of an area which is to be photographed. The circuit section Z is a digital indicator section where a given brightness value is indicated, as will appear from the description below. The circuit includes a power source E as well as a source switch S, the switch S and the power source E being connected in series between a positive conductor 11 and a negative conductor 12.

The several detector sections A, B, C, etc. respectively include a plurality of photosensitive means 1, 2, 3, etc. for receiving light from different parts of an area which is to be photographed. In the illustrated example the plurality of photosensitive means take the form of cadmium sulfide resistors which in a well known manner respond to light intensity for providing a given resistance value. Each photosensitive means 1, 2, 3, etc. forms part of a series circuit which includes a series-connected means connected in series with the particular photosensitive means. Thus the section A includes a series circuit formed by the photosensitive means 1, and the resistor $r_1$ which forms the series-connected means connected in series with the photosensitive means 1, this series circuit having a junction $a$ between the photosensitive means 1 and the resistor $r_1$. In the same way the photosensitive means 2 and the resistor $r_2$ form the series circuit of the section B, the photosensitive means 3 and the resistor $r_3$ form the series circuit of the section C, and so on. The several photosensitive means 1, 2, 3, etc. are carried by a suitable support in such a way that they are angularly oriented differently from each other so as to be directed to different parts of the area which is to be photographed. Thus the plurality of photosensitive means will take in light from different parts of an area which is to be photographed with all of these parts constituting the entire area, and therefore it becomes possible, without moving the structure which carries the plurality of photosensitive means, to take brightness readings simultaneously from all parts of a given area which is to be photographed. Thus with this arrangement it is not necessary for the operator to swing or otherwise move the system of the invention in order to scan the entire area which is to be photographed. It will be seen that the several series circuits each of which is formed by a photosensitive means and a resistor connected in series therewith are connected in parallel with each other between the positive and negative conductors 11 and 12 so that the parallel-connected series circuits area also in parallel with the power source. In the example of FIG. 1 the plurality of photosensitive means are electrically connected to the positive conductor 11 while the resistors in series therewith, respectively, are connected to the negative conductor 12.

A comparing circuit means is electrically connected to the junction between the photosensitive means and resistor of each of the above series circuits. Thus, each of the sections A, B, C, etc. includes a transistor whose base is connected to this junction, the junction $a$, $b$, of sections A, B being illustrated connected to the bases of transistors $Q_1$ and $Q_3$, respectively. The emitters of the latter transistors are respectively connected through resistors 7 and 8 to the negative conductor 12 while the collectors of these transistors are electrically connected directly to the positive conductor 11. The comparing circuits are in the form of differential amplifiers which include in addition to the transistors $Q_1$, and $Q_3$, the transistors $Q_2$, $Q_4$ whose emitters are electrically connected with the emitters of transistors $Q_1$, $Q_3$, respectively, as well as with the resistors 7 and 8, as illustrated in FIG. 1. The collectors of the transistors $Q_2$, $Q_4$ are electrically connected through electromagnetic coils $x_1$, $x_2$, respectively, of relays referred to below, to the positive conductor 11. The bases of the transistors $Q_2$, $Q_4$, etc. are all electrically connected to a junction point 1 between the emitter of a transistor Q and a resistor $r_o$ connected to the negative conductor 12. These latter components form part of the indicator section Z. The base of the transistor Q is connected with a normally closed switch $S_1$ which forms part of the relay which includes the coils $x_1$, $x_2$, etc. Thus, when any of these coils become energized the normally closed switch $S_1$ will open. It is apparent that the section C as well as the remaining unillustrated sections, any number of which may be provided as desired, are all constructed identically with the sections A, B, described above and are all connected in the same way into the circuit as illustrated in FIG. 1 and described above.

The indicator section Z includes a reference voltage means in the form of a pair of series-connected components at least one of which is a variable resistor. In the example of FIG. 1 the reference voltage means includes the variable resistor or potentiometer R having a slidable contact p, this variable resistor being connected in series with a divider resistance r, which may also be a variable resistor. Thus the series-connected components R, r which form the reference voltage means is connected in parallel with the above plurality of series circuits, each of which includes a photosensitive means and a resistor connected in series therewith, as well as in parallel with the power source E. The junction point m between the series-connected components of the reference voltage means is connected through the normally closed switch $S_1$ to the base of the transistor Q which is of high input impedance (or which may be an FET). A memory capacitor C is connected between the base of transistor Q and the negative conductor 12, while the collector of transistor Q is connected through a meter Ma to the positive conductor 11. This meter Ma forms an indicator means which is electrically connected in the above-described manner to the reference voltage means R, r for indicating brightness in the manner described below.

When the switch S of the circuit of FIG. 1 is closed, a reference voltage Vm appears at the junction m of the reference voltage means in the form of a resistance bleeder circuit consisting of the series-connected variable resistor R and the resistor r, this reference voltage in the section Z being in the form of a divided voltage Vm which varies as the sliding contact p is manually moved. Thus, the variable resistor R will be capable of providing between predetermined upper and lower limits a reference voltage which progresses away from one and toward the other of these limits. In the illustrated example it is assumed that the sliding contact p is moved upwardly with the divided reference voltage Vm gradually rising from a lower limit and being stored through the normally closed switch $S_1$ in the memory capacitor C which is coupled to the input of the transistor Q of high input impedance. As a result the transistor Q which has this stored input voltage applied thereto is driven in such a way as to provide a gradual swinging or turning of the pointer of the meter Ma connected to the collector of the transistor Q.

Substantially the same input voltage appears at the junction 1 between the emitter of the transistor Q and the inserted resistor $r_o$ as a follower voltage which is in turn applied to the several sections A, B, etc. at the bases of the transistors $Q_2$, $Q_4$, etc. as reference or scanning voltages to be compared with the photo-responsive voltages appearing at the junction points a, b, etc. of the several series circuits described above. Assuming that the photosensitive means 1 receives light of minimum brightness, then the coil $x_1$ of section A will be energized first, inasmuch as the divided voltage Va appearing at the junction point a will have a value lower than the corresponding photo-responsive voltages appearing at the junction points b, etc. of the several other series circuits whose photosensitive means receive greater amounts of light from other parts of the area which is to be photographed. As a result in this example the normally closed switch $S_1$ in the section Z will be automatically opened when the minimum amount of light received by the photosensitive means 1 has a predetermined relationship with respect to the reference voltage appearing at the junction point m. Consequently at this instant, upon opening of the switch $S_1$, the meter Ma indicates the lowest brightness value of the particular area which is to be photographed. Thus, the indicator means which includes the meter Ma will automatically indicate in this way the minimum brightness of the area to be photographed.

In order that the reference voltage appearing at the point m gradually increase away from the lower limit toward the upper limit provided by the variable resistor R, the latter may be adjusted or the divider resistance r may be constructed as a variable resistance which may be adjusted while the resistor R is maintained at a predetermined value. In the above example it is assumed that the slidable contact p of the variable resistor R is manually moved. However, it is clear that the slidable contact may be automatically moved by a suitable drive so that the change in the resistance can be automatically brought about to provide an automatic scanning. Thus, as is shown schematically in FIG. 2, a suitable motor M may be connected to the slidable contact of the variable resistor for driving the slidable contact.

Figure 2:
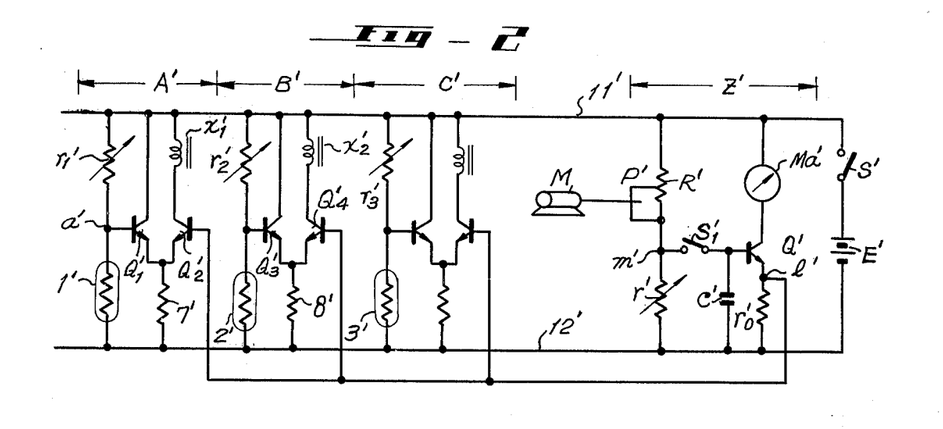
FIG. 2 shows another embodiment of a system according to the invention, the embodiment of FIG. 2 being driven while the embodiment of FIG. 1 is manually operated.

While the embodiment of FIG. 1 is designed to determine the minimum brightness at the object or area to be photographed, it is also possible to provide another embodiment of the invention capable of determining the maximum brightness at the object or area to be photographed. This is brought about, as shown in FIG. 2, where components corresponding to those of FIG. 1 are indicated by the same reference characters primed, by interchanging the photo-sensitive means of the several series circuits and the several resistors connected in series therewith, so that in effect the series circuits are inverted between the positive and negative conductors. Thus with the embodiment of FIG. 2 the particular photosensitive means which receives light of maximum brightness will have the lowest resistance value and the embodiment of FIG. 2 will indicate the maximum brightness in the manner similar to that described above in connection with FIG. 1.

Figure 3:
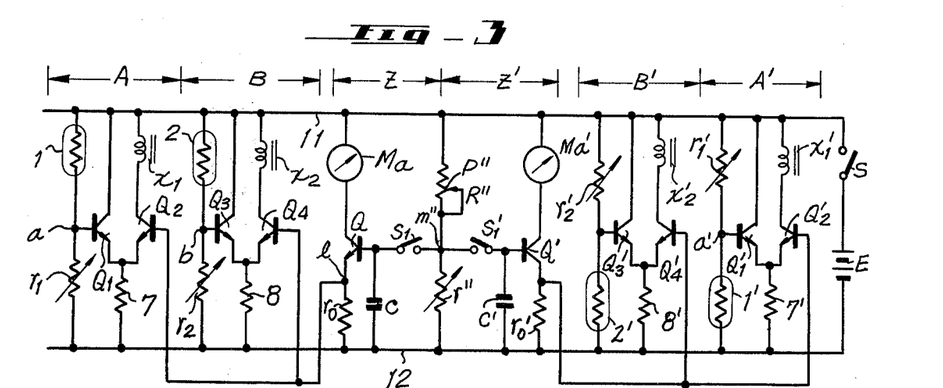
FIG. 3 is a wiring diagram of a further embodiment of the invention for indicating both maximum and the minimum brightness.
Figure 4:
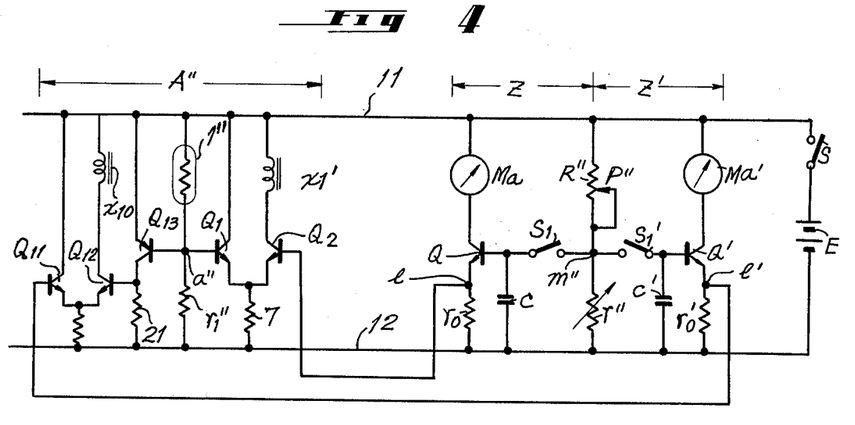
FIG. 4 illustrates a further embodiment of the invention where each photosensitive means may be utilized either for maximum or minimum brightness.

FIGS. 3 and 4 illustrate embodiments each of which is designed for simultaneously determining both the maximum and minimum brightness, whereas the embodiments of FIGS. 1 and 2 are designed only for determining the minimum and maximum brightness, respectively. Referring to FIG. 3, the components therein which correspond to those described above are indicated by the same reference characters without further description in detail thereof. Referring to FIG. 3, it will be seen that a reference voltage means is provided by a resistance bleeder circuit similar to those described above and having its components designated by the same reference characters which have a double prime. The circuitry for determining lowest brightness, corresponding to FIG. 1, is shown at the left of FIG. 3 while the circuitry for determining maximum brightness, corresponding to FIG. 2, is shown at the right of FIG. 3. Thus the embodiment of FIG. 3 is a combination of the embodiments of FIGS. 1 and 2 having a common reference voltage means. With the embodiment of FIG. 3 when the source switch S is closed, the divided reference voltage $Vm''$ appears at the junction point $m'$ of the centrally located resistance bleeder circuit forming the reference voltage means of this embodiment and including the variable resistor $R''$ and the variable resistor $r''$ connected in series therewith. Assuming that the slidable contact $p''$ of the variable resistor $R''$ is moved upwardly for providing a gradually increasing voltage $Vm''$, an electrical charge is stored through the normally closed switches $S_1$ and $S'_1$ in the memory capacitors C and C', thus driving the transistors Q, Q' of high input impedance which are respectively coupled to the capacitors C, C', so that the pointers of the meters Ma, Ma' turn, these meters being connected into the collector circuits of the transistors Q, Q' as described above in connection with FIGS. 1 and 2.

The voltage stored in the respective capacitors C, C' serves also as an emitter follower voltage which is capable of scanning through the transistors Q, Q' the maximum and minimum brightness through the circuits separately situated on opposite sides of the reference voltage means with the maximum and minimum brightness values being respectively indicated by the meters Ma' and and Ma of the sections Z' and Z, in the manner described above.

The embodiment of FIG. 4 differs from that of FIG. 3 in that each photosensitive means is capable of detecting either maximum or minimum brightness. Thus, only one section $A''$ is illustrated, but it will be understood that a plurality of such sections are included so that the structure has the plurality of photosensitive means respectively directed to different parts of the area which is to be photographed. The indicator sections Z, Z' of FIG. 4 are identical with those of FIG. 3 and operate in the same way.

Each of the brightness detector sections, of which only section $A''$ is illustrated for the sake of simplicity, is thus exposed to light coming from a given part of the area which is to be photographed. Assuming that the section $A''$ shown in FIG. 4 receives light from that part of the area which has minimum illumination, then upon closure of the switch S of FIG. 4 there is developed at the junction point $a''$ between the photosensitive means $1''$ and the resistor $r_1''$ of the series circuit a divided photo-responsive voltage $Va''$ which will have the minimum value as compared with the other photo-responsive voltages inasmuch as the internal resistance of the photosensitive means $1''$ is higher than that of any of the other photosensitive means of the other detector sections.

There is simultaneously developed at the junction point $m''$ of the reference voltage means the divided reference voltage $Vm''$ which gradually increases in value during upward movement of the sliding contact $p''$ of the variable resistor $R''$. This reference voltage is partially applied as an emitter follower voltage of the transistor Q through the normally closed switch $S_1$ to the transistor $Q_2$ of the differential amplifier circuit forming the comparing circuit means as described above, and since in the above example the photosensitive means $1''$ receives light of minimum brightness the coil $x_1'$ is the first to become energized, thus opening the relay switch $S_1$ and providing as described above at the meter Ma an indication of minimum brightness.

The reference voltage $Vm''$ is also partially applied, on the other hand, as an emitter follower voltage of the transistor Q' through the normally closed switch $S_1'$ also to the brightness detector section $A''$. In the latter section the base voltage of the transistor $Q_{12}$, which is opposed to the transistor $Q_{11}$ of the left differential amplifier circuit shown in FIG. 4 is at the highest level inasmuch as this base voltage of transistor $Q_{12}$ is derived from the collector of the transistor $Q_{13}$. This latter operation results from the fact that the transistor $Q_{13}$ is most conductive inasmuch as the light received by the photosensitive means $1''$ is of minimum brightness and the voltage drop at the resistor 21 connected to the collector of transistor $Q_{13}$ is of a maximum magnitude. As a result, the maximum brightness detector section Z' is affected in no way by the reference voltage $Vm''$ developing according to the variation provided by the variable resistor $R''$.

Assuming, however, that the photosensitive means $1''$ is exposed to light of maximum brightness, then the voltage at the junction point $a''$ reaches the maximum value and as a result the minimum brightness detector section Z is not operative as a result of the principle described above. The base-emitter input voltage of transistor $Q_{13}$ is applied from the opposite ends of the photosensitive means $1''$ and the transistor $Q_{13}$ under these conditions is least conductive. Therefore the transistor $Q_{13}$ responds first, as compared with the corresponding transistors in the corresponding detector sections which are not illustrated, to upward movement of the sliding contacts $p''$ of the variable resistor $R''$, causing the electromagnetic coil $x_{10}$ to open the switch $S_1''$, thereby indicating at this instant at the meter Ma' the maximum brightness.

Figure 5:
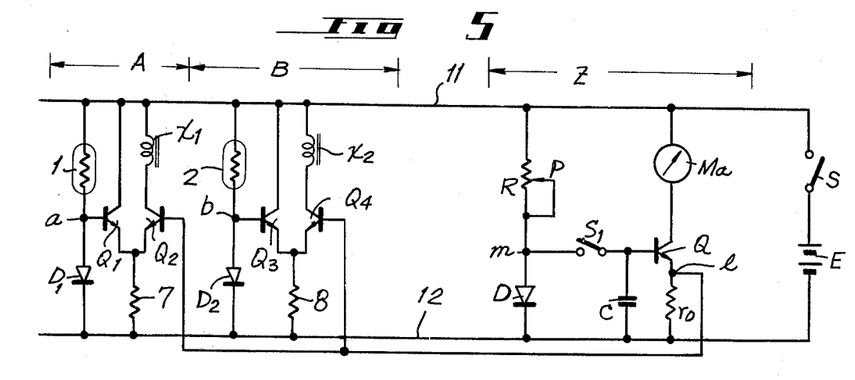
FIG. 5 illustrates an embodiment of the invention similar to that of FIG. 1 but utilizing diodes instead of resistors.

With the embodiments described above the information derived from the illustrated circuitry is in the form of a series of multiples, according to a geometric progression, and therefore cannot be directly used for regulating the exposure of a photographic camera or the like. Further processing of this type of information is required. In order to avoid this inconvenience requiring additional calculations to achieve values which can be directly used for regulating exposure, it is possible to use diodes such as the diodes D, $D_1$, etc. illustrated in FIG. 5 as the series-connected components of the illustrated series circuits. Thus the series-connected means of the series circuits of FIG. 5 include the diodes $D_1$, $D_2$ which are connected respectively in series with the photosensitive means 1, 2 of the illustrated series circuits of the sections A, B, of FIG. 5, while the diode D of FIG. 5 forms the series-connected component connected in series with the variable resistor R of the reference voltage means of FIG. 5. As a result the photoinformation, initially in the form of a series of multiples according to a geometric progression is log-converted into maximum and minimum brightness values at equal intervals according to an arithmetic progression. It will be seen that the embodiment of FIG. 5 is substantially the same as the embodiment of FIG. 1, except that the several divider resistances $r_1, r_2 \ldots r$ of the several sections A, B, Z are replaced by the corresponding diodes. The remaining components are designated by the same reference characters as those of FIG. 1.

Thus, with the embodiment of FIG. 5 when the source switch S is closed the junction points $a$, $b$, of the several series circuits will be provided with the divided photo-responsive voltages in accordance with the particular brightness detected from the area which is to be photographed, while at the junction point $m$ of the reference voltage means there is the reference voltage determined by the variable resistor R, with all of these values appearing in log-converted form and varying at equal intervals according to an arithmetic progression. In the manner described above, as the voltage across variable resistor R rises due to movement of the sliding contact $p$, the electromagnetic solenoid or coil of that detector section A, B, etc. which receives light of the minimum brightness is first energized to open the switch $S_1$ so as to provide at the meter Ma an indication of minimum brightness. This indication is a light value or LV indication which can be directly used advantageously in order to facilitate a photographic operation.

It is of course possible to replace in the embodiment of FIG. 5 the diode D with a resistor with the value of the variable resistor R being functionally determined so as to provide at the junction point m a reference voltage which will vary at equal intervals, while also utilizing for this purpose variable resistors instead of the diodes $D_1$, $D_2$, etc. and instead a nonlinear diode may be utilized at the indicator section Z for the resulting value which will vary at equal intervals according to an arithmetic progression. Such an arrangement is described below in connection with FIG. 8.

The embodiments of the invention which are illustrated in FIGS. 6–12 are constructed so that the several electromagnetic solenoids or relay coils are replaced by lamps $L_1$, $L_2$, etc. and the normally closed switches of the relays which are adapted to be opened upon energizing of one of these coils as well as the memory capacitors are eliminated from the indicator section Z so that the lowest, intermediate, and maximum brightness values, for example, will be discontinuously but successively indicated by the lamps.

The manner of determination of brightness starting from minimum and ending at maximum brightness will now be described in connection with FIG. 6. Assuming that the section A of FIG. 6 receives light of minimum brightness then upon closing of the switch S of FIG. 6 the various photo-responsive voltages will appear as described above at the junction points $a$, $b$, etc. while the reference voltage appears at the junction points $m$, and the voltage Va at the junction point $a$ will have the minimum value.

The variable resistor $r$ is preliminarily set to a suitable value and the sliding contact $p$ of the variable resistor R is preliminarily set to its lowermost position so that the divided reference voltage Vm initially appearing at the junction point $m$ will be lower than the voltage Va appearing at the junction point $a$. Under these conditions the lamps $L_1$, $L_2$ are initially in their extinguished state, and the pointer of the meter Ma is at the lowest graduation. As the sliding contact $p$ is gradually moved upwardly, the divided voltage Vm progressively increases and the transistor $Q_2$ is the first to become conductive when the voltage Vm exceeds the voltage Va which is the minimum photo-responsive voltage in the illustrated example. As a result the lamp $L_1$ will transfer from the extinguished to the illuminated state at the collector of the transistor $Q_2$. The operator will immediately notice that the lamp $L_1$ has become illuminated since the lamps are arranged so as to be visible to the operator, and at this moment the operator will stop the movement of the slidable contact $p$ and will note the reading at the meter Ma, so that in this way the desired detection of minimum brightness is achieved.

Now the operator will continue to displace the slidable contact $p$ so that the reference voltage Vm continues to increase and the lamps $L_2$, etc. in the other detecting sections B, etc. will become successively illuminated as the reference voltage reaches values corresponding to the photo-responsive voltages derived from the plurality of photosensitive means which detect light of increasing brightness. In this way as the successive lamps transfer from the extinguished to the illuminated state there is a step-by-step indication at the meter Ma of successive intermediate brightness values which increase from one to the next. The reading at the meter Ma when the last lamp becomes illuminated indicates the maximum brightness value.

Of course, with this example it has been assumed that the lamps will become successively illuminated so as to indicate successive brightness values progressing from minimum to maximum illumination. If it is desired to reverse the sequence so that maximum illumination is indicated first and there is a progressive indication from maximum toward minimum brightness, then the sliding contacts $p$ of the variable resistor R is previously set at its uppermost or highest value position so that the voltage Vm initially appearing at the junction point $m$ is initially of a maximum value which is greater than the maximum voltage appearing at that one of the junction points $a$, $b$, etc. which provides a photo-responsive voltage corresponding to maximum brightness. Thus if it is assumed in the example of FIG. 6 that at the junction point $b$ there will appear a photo-responsive voltage resulting from the fact that the photosensitive means 2 receives light of maximum brightness, then the initial reference voltage Vm is greater than this voltage Vb. Also, the meter Ma is initially set so that the pointer thereof indicates the maximum value and will progress toward the minimum value. With this arrangement as the sliding contact $p$ is gradually moved or lowered so as to provide a reference voltage Vm which gradually progresses from the maximum toward the minimum limit, then the value indicated by the pointer of the meter Ma will also gradually diminish, and of course, all of the lamps $L_1$, $L_2$, etc. are initially in their illuminated state with only the lamp $L_2$ becoming extinguished first when the reference voltage Vm is reduced to a value corresponding to that of the photo-responsive voltage Vb at the point $b$. At this instant, when the lamp $L_2$ transfers from the illuminated to the extinguished state the meter Ma will indicate the maximum brightness value. As the sliding contact $p$ is further moved to provide the continuously diminishing reference voltage, the several lamps will become successively extinguished indicating in a step-by-step manner intermediate values of gradually lesser illumination until the last lamp becomes extinguished indicating at this instant at the meter Ma the value corresponding to minimum brightness.

It is to be noted that instead of including the lamps $L_1$, $L_2$, etc. in the collector circuits of the transistors $Q_2$, $Q_4$, etc., it is also possible to include these lamps, instead, in the collector circuits of the transistors $Q_1$, $Q_3$, etc. for effective determination of maximum, intermediate, and the minimum brightness, but the manner in which the lamps become illuminated or extinguished in this case will be opposed to the manner described above in connection with the embodiment of FIG. 6.

Figure 6:
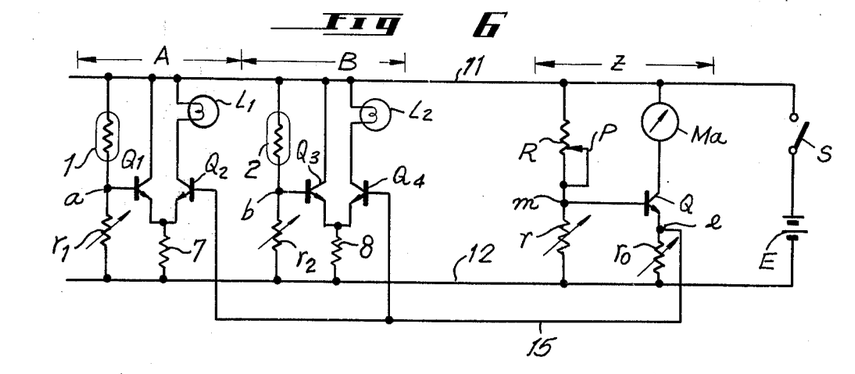
FIG. 6 shows a further embodiment of the invention according to which lamps are used for indicating brightness.

The arrangement illustrated in FIG. 6 has a certain inconvenience in that the indication given by way of the meter Ma is a photo-information which varies in a series of multiples according to a geometric progression which cannot be directly utilized for determining exposure factors to be used with a camera or the like for making photographs. The information provided by the arrangement shown in FIG. 6 requires further processing such as calculation of a value which may be directly used for determining exposure of film in a camera, and this further processing is an undesirable complication inherent in the arrangement shown in FIG. 6.

Figure 7:
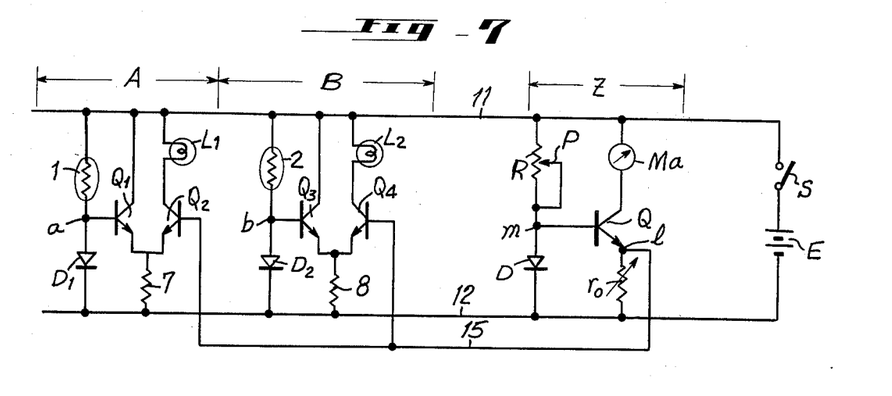
FIG. 7 is an arrangement similar to FIG. 6 utilizing diodes rather than resistors.

In order to avoid this latter drawback, the embodiment of FIG. 7 may be utilized. According to this embodiment the series-connected means of the series circuits which include the photosensitive means 1, 2, etc. take the form of diodes $D_1$, $D_2$, etc., rather than resistors as shown in FIG. 6, and the series-connected components which form the reference voltage means include in addition to the variable resistor R a diode D, rather than a second resistor as shown in FIG. 6. These diode components D, $D_1$, $D_2$, etc. serve as non-linear resistance elements for achieving a log-conversion so that the photo-information which at the photosensitive means 1, 2, etc. varies according to a geometric progression will be converted by the components $D_1$, $D_2$, etc. to an arithmetic progression where the series of brightness values ranging from the highest to the lowest and intermediate values therebetween all vary at equal intervals. Except for the above differences the embodiment of FIG. 7 is identical with that of FIG. 6 and the corresponding elements are designated by the same reference characters.

With the embodiment of FIG. 7 the slidable contact p of the variable resistor R is set initially at one or the other of its end positions which will correspond to the maximum or minimum reference voltage, and upon closure of the source switch S there will appear at the junction points a, b, etc. in the respective detector sections A, B, etc. divided photo-responsive voltages Va, Vb, etc. according to the intensity of the light at that part of the area from which light is respectively received by the several photosensitive means. At the junction point m of the reference voltage means there is developed a reference voltage Vm across the resistor R which also is in log-converted form. Thus the voltage Vm will also vary at equal intervals according to an arithmetic progression as the slidable contact p is moved in one direction or the other, and the several lamps $L_1$, $L_2$, etc. will successively transfer between their illuminated and extinguished states in the order progressing from maximum brightness gradually through intermediate brightness to minimum brightness, or in the reverse progression, so that the several brightness or light values will be indicated directly at the meter Ma in the same way as in the embodiment of FIG. 6 but in a log-converted form which provides values which can conveniently be used directly for photographic operations.

While there will appear at the junction point m the divided reference voltage Vm which varies at equal intervals according to an arithmetic progression, it is to be noted that the value of the variable resistor R must vary at the same rate as that at which the photo-responsive resistances of the cadmium sulfide components 1, 2, etc. vary with change in light intensity so that the voltage Vm will vary at the same rate as the voltage Va, Vb, etc. In other words, an arrangement is required where the value of the variable resistor R will vary in a series of multiples according to a geometric progression in the same way as the rate of chage of the resistance values at the photosensitive resistors 1, 2, etc. In view of this latter required relationship, it is possible to achieve the divided reference voltage Vm by utilizing instead of the diode D a suitable resistor which together with the variable resistor R will provide the divided reference voltage Vm at equal intervals according to an arithmetic progression as a result of the functional setting and interrelationship between the series-connected resistors of such a reference voltage means.

While the arrangement shown in FIG. 7 presents certain advantages over the arrangement shown in FIG. 6, as described above, nevertheless there are certain drawbacks in connection with FIG. 7. Thus, the several diodes $D_1$, $D_2$, etc. which serve as non-linear resistors for log-conversion purposes not only undesirably increase the number of components required but also cause the assembly to be undesirably affected by factors such as temperature fluctuations. In order to avoid these drawbacks an improved embodiment is provided, as illustrated in FIG. 8, according to which the diode for log-conversion is utilized only at the indicator section where the various brightness values are indicated and the other diodes present in the embodiment of FIG. 7 are eliminated.

Figure 8:
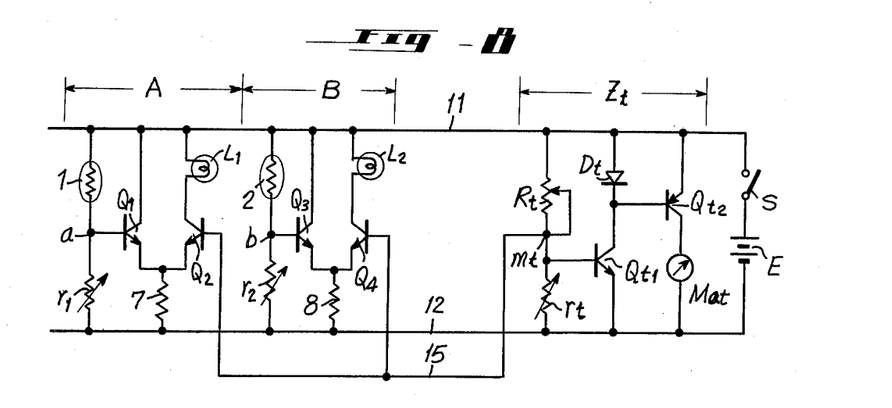
FIG. 8 is a wiring diagram of a variation of the arrangement of FIG. 7 according to which a single diode is used.

Thus, referring to FIG. 8 it will be seen that when the source switch S is closed there will appear at the junction points a, b, etc. the several photo-responsive voltages Va, Vb, etc. while at the junction point mt of the reference voltage means there is a divided reference voltage Vmt. The variable resistor Rt of the illustrated reference voltage means is selected so as to vary according to a series of multiples with a geometric progression in order that the voltage Vmt will vary at the same rate as the photo-responsive voltages Va, Vb, etc., as described above, and it will be noted that the several series circuits which include the cadmium sulfide photosensitive means have resistors connected in series therewith while the series-connected components of the reference voltage means includes also a resistor rt connected in series with the resistor Rt. It is apparent that from the above description and from the circuit of FIG. 8 that the various photo-responsive voltages Va, Vb, etc. will be scanned by or compared with the reference voltage Vmt which develops at the section Zt.

As has been indicated above, the resistance of the cadmium sulfide photosensitive means varies in a series of multiples according to a geometric progression in response to light received thereby, in accordance with light intensity at the object which is to be photographed, this light intensity also varying, as is well known, in a series of multiples according to a geometric progression. In the illustrated example the cadmium sulfide resistance/brightness gradient has a value of 1. Although this variation in a series of multiples according to a geometric progression cannot exist with a gradient value which is less than 1, the desired effect in accordance with the present invention is achieved because the value or characteristics of the variable resistor R are selected so as to vary according to a geometric progression at the same rate as the variation of the resistance of the cadmium sulfide photosensitive means.

Considering now the indicator section Zt of FIG. 8, it will be seen that the reference voltage Vmt developing across the divider resistance $rt$ is applied to the base of the transistor $Q_{t1}$ so that the latter has an electric current flowing therethrough as an input which varies also in a series of multiples according to a geometric progression, so that there develops as a result a voltage varying at equal intervals according to an arithmetic progression across the diode Dt for log-conversion, this diode being inserted in the collector circuit of the transistor $Q_{t1}$. The brightness value which is determined in this way is indicated at the meter Mat in a log-converted form as was the case with the embodient of FIG. 7. This log-converted brightness value has a given LV magnitude and may be used directly to determine exposure conditions in a photographic operation with a camera or the like.

The meters Ma, Mat, as disclosed in the above embodiments, will indicate either the maximum or minimum brightness values. Intermediate brightness values and the range between maximum and minium brightness values must be recorded in an independent manner so as to be retained for a situation where it is desired to calculate the brightness range, for example.

Figure 9:
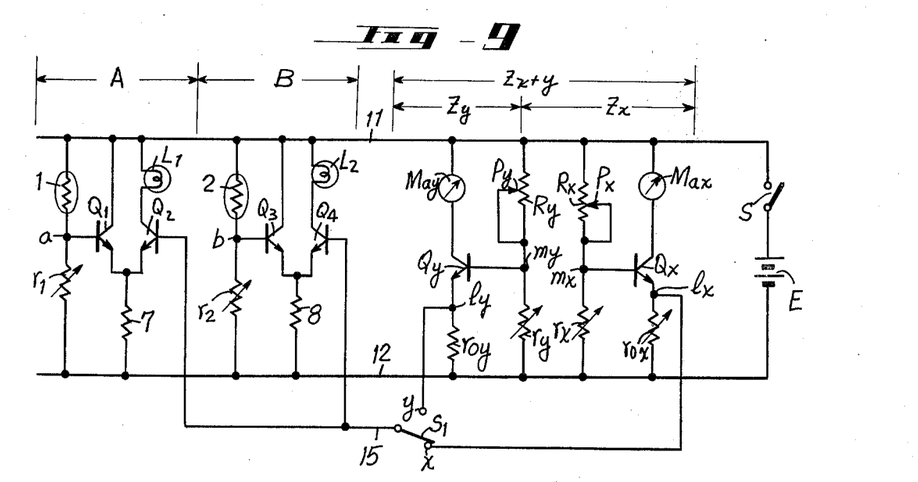
FIG. 9 illustrates an embodiment of the invention where lamps are used in a system for indicating both maximum and minimum brightness.

In order to avoid this latter inconvenience a further improvement is illustrated in the embodiment of FIG. 9 where the circuit includes a pair of indicator sections, whereas only one such section is utilized in the previous embodiments. These identical but separate sections Zx and Zy form in FIG. 9 the entire indication section Zx + y. It will be seen that each of these sections Zx and Zy has its own reference voltage means so that the section Zx + y has a reference voltage means made up of two pairs of series-connected components. With this arrangement the slidable contact $px$ of the variable resistor Rx of the section Zx is initially set to an end position corresponding to minimum voltage while the slidable contact $py$ of the variable resistor Ry of the section Zy is set at an opposed end position corresponding to maximum voltage. The several brightness detector sections A, B, etc. of FIG. 9 are identical with those of FIG. 6. Thus the components of the several partial brightness detector sections A, B, etc. are designated by the same reference characters as those used in FIG. 6 without a detailed description of these components. The bases of the transistors $Q_2$, $Q_4$, etc. in the several partial brightness detection sections are electrically connected with a common conductor 15 which is connected with a change-over switch $S_1$ capable of alternately completing circuits through the pair of contacts $x$ and $y$. The contacts $x$ is electrically connected with the junction point $1x$ in the section Zx between the emitter of transistor Qx and the resistor $r_{ox}$, while the contact $y$ is connected to the junction point $1y$ in the section Zy between the emitter of transistor Qy and the resistor $r_{oy}$.

In the manner described above there will be provided at the junction point $a$ a divided photo-responsive voltage Va which will be the minimum photo-responsive voltage assuming that the light of minimum brightness is received by the photosensitive means 1, while in the illustrated example at the junction point $b$ there will appear a divided photo-responsive voltage Vb which is of a maximum value assuming that the light of greatest intensity is received by the photosensitive means 2. These photo-responsive voltages will of course appear upon closing of the source switch S, with the above assumption that the section A detects minimum brightness and section B detects maximum brightness.

When the change-over switch $S_1$ engages the contact $x$, as illustrated in FIG. 9, then the several photo-responsive voltages of the several series circuits are scanned by or compared with the emitter-follower voltage of the transistor Qx in response to movement of the sliding contact $px$ in a direction which provides a continuously increasing reference voltage, and it will be seen that with the above example where light of minimum intensity is received by the photosensitive means 1 the lamp $L_1$ will be the first to become illuminated so that the reading at the meter Max at this instant will give an indication of minimum brightness. All that the operator need do is stop the movement of the slidable contact $px$ when the lamp $L_1$ becomes illuminated, and the meter Max will remain in a position indicating the minimum brightness. Thus all that the operator need do is note when the first lamp becomes illuminated and then the movement of the slidable contact $px$ is terminated and the meter Max will indicate minimum brightness.

Then the operator will move the switch $S_1$ so that it engages the contact $y$, with the result that all of the lamps $L_1$, $L_2$, etc. transfer to the illuminated state. Now the sliding contact $py$ is moved in a direction which provides continuously decreasing reference voltage at the junction point $my$ and in the above example where the section B receives light of maximum brightness it will be seen that the lamp $L_2$ will be the first to transfer from the illuminated to the extinguished state. Thus when the operator notes that one of the lamps has become extinguished he will terminate the movement of the slidable contact $py$, and the meter May will remain in a position indicating the value of the maximum brightness.

Therefore, with this arrangement it is possible to derive the maximum and the minimum brightness values from the meters May and Max and of course the difference between these values will be the range of brightness from which an intermediate value may be easily calculated.

For the sake of simplicity and providing a clear description of the invention, the embodiment of FIG. 9 has been described in such a way that separate operations are required for the switch $S_1$ and the sliding contacts $px$ and $py$. While such separate operations can of course be provided, it is clear that in the actual construction there may be a rotary member similar to a dial which is rotated in one direction to change the switch $S_1$ from one to the other contact while the continued rotary movement of such a member will displace one of the slidable contacts in the required direction, whereas rotation of such a member in the opposite direction will change the switch $S_1$ over to the other contact and will bring about movement of the other slidable contact in the required direction during continued rotary movement. It is also clear that the embodiment of FIG. 9 may be readily modified so as to utilize log-conversion as in the embodiments of FIGS 7 or 8, and it is clear from the description of the embodiments of FIGS. 7 and 8 that such log-conversion is preferable.

Figure 10:
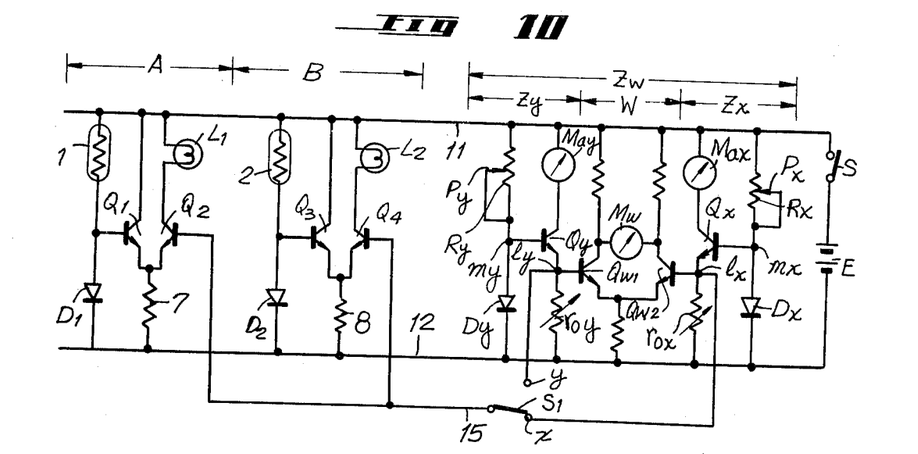
FIG. 10 is a wiring diagram of a further development of the embodiment of FIG. 9 according to which the range between maximum and minimum brightness is also indicated.

FIG. 10 illustrates an embodiment which corresponds to that of FIG. 9 but which is further improved in that the value of the brightness range will be automatically indicated without requiring any photographic operation or calculations. The partial brightness detector sections A, B, etc. of FIG. 10 have the same construction as those of FIG. 7 and are designated by the same reference characters. The indicator section Zw of FIG. 10 includes both the maximum and minimum brightness indicator sections Zy and Zx which respectively differ from those of FIG. 9 in that the series-connected components of each reference voltage means includes a diode connected in series with the variable resistor. Thus, the resistors $rx$ and $ry$ of FIG. 9 are respectively replaced in FIG. 10 by the diodes Dx and Dy. These diodes operate as non-linear resistance elements for log-conversion purposes.

The embodiment of FIG. 10 includes in addition, a brightness range value indicator subsection W forming part of the indicator section Zw for the purpose of indicating the brightness range value as based on the maximum and minimum brightness values respectively determined by the maximum brightness indicator subsection Zy and the minimum brightness indicator subsection Zx. For the sake of simplicity of illustration the maximum and minimum brightness indicator sections are designated by the same reference characters as those of FIG. 9. The brightness range value indicator subsection W has an arrangement according to which the bases of transistors $Qw_1$ and $Qw_2$ are respectively connected to the junction points $ly$ and $lx$ while the emitters of these transistors $Qw_1$ and $Qw_2$ are connected through a common resistor to the negative conductor 12. The collectors of the latter transistors are respectively connected through suitable resistors to the positive conductor 11, and a meter Mw is connected between the collectors of these transistors. Thus it will be seen that the transistors $Qw_1$ and $Qw_2$ constitute a differential amplifier in the same way that the pair of transistors $Q_1$ and $Q_2$ of section A, $Q_3$ and $Q_4$ of section B etc. form also differential amplifiers as described above.

With the embodiment of FIG. 10, upon closing of the source switch S with the change-over switch $S_1$ engaging contact $x$, the slidable contact $px$ is gradually moved in a direction from the minimum toward the maximum limit of the reference voltage so that minimum brightness will be indicated at the meter Max when the first lamp becomes illuminated, as described above. Then the switch $S_1$ is changed over to engage the contact $y$ and the slidable contact $py$ is gradually moved in a direction from the maximum toward the minimum voltage so as to obtain the maximum brightness indication at the meter May when the first lamp becomes extinguished, as described above in connection with FIG. 9.

The information signals corresponding to these maximum and minimum brightness values are separately applied in the form of a voltage, as the emitter follower voltage of the transistors Qx and Qy to the bases of the transistors $Qw_1$ and $Qw_2$ which together constitute a differential amplifier as set forth above, and the meter Mw will respond to the difference between both of these base input signals so as to indicate directly a value equivalent to the range of brightness between the maximum and minimum brightness values.

Both of these input signals are applied, in the embodiment of FIG. 10, to the transistors $Qw_1$ and $Qw_2$ in log-converted form, so that the brightness range at a generally high level of brightness for the entire area and the brightness range at a generally low brightness for the entire area will present the same brightness range value where these ranges are equal. Thus in a situation where the maximum brightness is, for example, 5 LV and the minimum brightness is 1 LV, as well as in a case where the maximum brightness is 8 LV and the minimum brightness is 4 LV, there will be a range of 4 LV indicated by the meter Mw since in both cases the difference between maximum and minimum brightness is 4 LV. As pointed out above, with this particular embodiment there is no inconvenient further calculation operation required inasmuch as the brightness range value is directly obtained in the form of an arithmetic progression.

Figure 11:
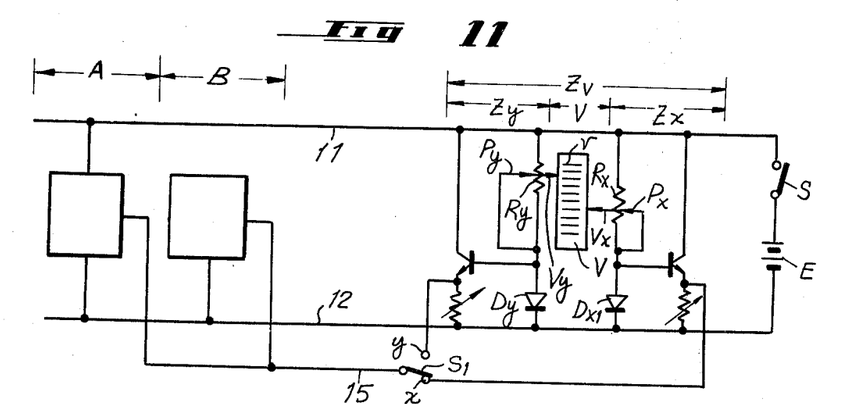
FIG. 11 is a schematic wiring diagram of a further embodiment of the invention where maximum and minimum brightness as well as the range therebetween are indicated on a single scale.

FIG. 11 illustrates a further embodiment of the invention which includes indicator sections as in the embodiments of FIGS. 9 and 10 described above. The components of FIG. 11 which are common to those of FIGS. 9 and 10 are designated by the same reference characters. With the embodiment of FIG. 11, however, there are no meters, a feature in sharp contrast to the embodiments of FIGS. 9 and 10 where several meters Max, May, and Mw are utilized.

More specifically, the schematically indicated sections A, B, etc. of FIG. 11 are identical with those of FIG. 10 while the indicator sections Zy and Zx of FIG. 11 are the same as those of FIG. 9 except that diodes are utilized instead of the series-connected resistors in the pair of reference voltage means. With the embodiment of FIG. 11 a graduated means for indicating the brightness values and brightness range takes the form of a suitably graduated plate V having light value graduations thereon as schematically illustrated in FIG. 11. The sliding contacts $px$ and $py$ respectively have pointer extensions Vx and Vy which are respectively movable along the scale of graduations $v$ of the plate V which is maintained stationary in the position illustrated in FIG. 11. Thus, as the slidable contacts are moved it is possible to read directly on the plate V the particular light value corresponding to the brightness. Thus, the indicator plate V is calibrated according to the brightness or light values which are to be detected so that the pointers Vx and Vy may directly indicate the minimum and maximum brightness or light values. At the same time, the spacing between the pointers will indicate directly on the plate V the range of brightness.

Thus, the embodiment of the invention which is illustrated in FIG. 11 is of particular advantage in that it has a high degree of ruggedness and durability inasmuch as there are no delicate instruments such as meters including movable components and at the same time the maximum, minimum and intermediate brightness or light values may be directly read.

The principle according to which the technique for indicating the brightness range defined between maximum and minimum brightness or light values may be utilized in further fields of applications such as for giving an indication of an intermediate value of the range of brightness and utilization may be made of these techniques as index for regulating exposure factors of a camera such as the exposure time to be provided by an automatic electronic shutter or the stop value to be provided by an automatically operable diaphragm.

Figure 13:
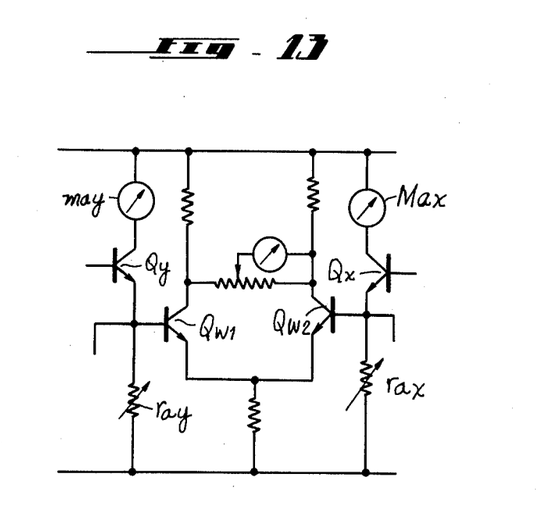
FIG. 13 is a fragmentary wiring diagram showing a further variation of the embodiment of FIG. 10 according to which an intermediate value between the maximum and minimum brightness values is provided.

FIG. 13 indicates a variation of FIG. 10 according to which it is possible to indicate an intermediate value of the range of brightness. Thus, it will be seen that the meter Mw of FIG. 10 is replaced in FIG. 13 by a potentiometer. With the embodiment of FIG. 13 a meter is provided between the slider of the potentiometer and the collector of the transistor $Qw_2$ so that in this way the voltage across the collectors of the transistors $Qw_1$ and $Qw_2$ may be selectively divided. In this way an intermediate brightness value of the particular range of brightness may be indicated for achieving a particular control in an exposure made in connection with obtaining a photograph. For this purpose it is only necessary to preselect the slider of the potentiometer shown in FIG. 13 to a predetermined position for achieving in this way an indication of a suitable intermediate value which may be used in the setting of a camera.

It will be seen from FIG. 13 that the inputs respectively provided to the bases of the transistors $Qw_1$ and $Qw_2$ of the differential amplifier are applied with a voltage divided by the variable resistors *ray* and *rax*, so that the meter indication derived from the potentiometer of FIG. 13 may be utilized, for example, as an index for regulation of the exposure time when the variable resistor *ray* is set to a value corresponding to the film speed and the resistor *rax* is set to a value corresponding to the particular aperture at which the diaphragm is set. These exposure-determining factors can be rearranged, however, in such a way that the resistor *ray* is still utilized for introducing the factor of film speed while the resistor *rax* is utilized for introducing a preselected exposure time and the meter of the potentiometer will then indicate the required setting of the diaphragm. Thus, it is possible with such an arrangement to derive for particular photographing conditions an automatic indication of the proper magnitude of a particular exposure factor to be utilized in exposing film in a camera.

Therefore with such an arrangement it is possible to provide automatically and rapidly an intermediate value of the particular brightness range for proper exposure or an intermediate value which is appropriate for a particular photographing intention or condition, so that in this way a camera may be quickly and conveniently set thus achieving an extremely great convenience in photography.

It will be seen that the manner of operation before providing the intermediate value will be similar to that of a conventional camera or exposure meter in that two values are preselected and the third value will be indicated. In other words in addition to film speed, which is course predetermined, one of the factors of exposure aperture or exposure time is preselected and the other one will be indicated.

Furthermore, instead of providing simply an indication of the setting of the camera with an arrangement as shown in FIG. 13 it is possible to automatically set the camera in the manner illustrated in FIGS. 12 and 14 and described below.

Figure 12:
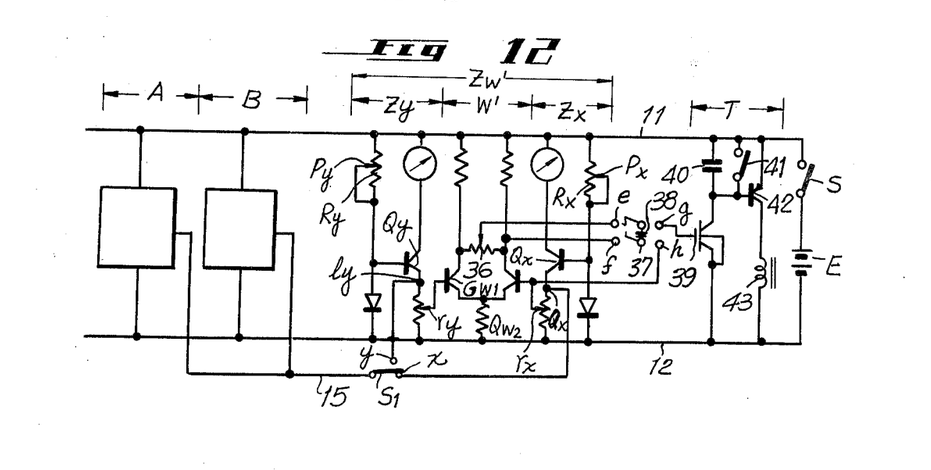
FIG. 12 is a schematic wiring diagram of a system according to the invention for automatically setting a shutter of a camera.

FIG. 12 illustrates an embodiment according to which it becomes possible to automatically determine the exposure time by automatically controlling an electronic shutter control structure utilized in a camera which measures light internally, for example, as in the case of a single lens reflex camera, the factor for controlling the exposure time in the automatic manner shown in FIG. 12 being derived from an intermediate value of the brightness range as described above. It will be seen that the embodiment of FIG. 12 has components corresponding to those of FIG. 10 and designated by the same reference characters. In FIG. 12 the circuit section T designates an electronic shutter control assembly. The circuitry further includes a double-pole double-throw switch 37 having a normally closed contact *e* connected to the slider of variable resistor 36, so that this part of the structure corresponds to that of FIG. 13 except that there is no meter connected to the slider of the potentiometer. Instead the slider of the potentiometer is connected directly to the normally closed contact *e*. In addition the switch 37 has a normally closed contact *f* connected to the collector of the transistor $Qw_2$. The switch 37 also has a pair of normally open contacts *g* and *h*. The normally open contacts *h* is connected to the base of transistor $Qw_2$ while the normally open contact *g* is connected to the gate of field effect transistor or FET 39 which serves as a log-extension or logarithmic expansion current regulator element. A memory or storage capacitor 38 is connected between the pair of swingable switch blades of the switch 37. FET 39 has its source connected to the negative conductor 12 and its drain connected through timing capacitor 40 to the positive conductor 11. The drain is also electrically connected with a normally closed switch 41 which is connected in parallel across the timing capacitor 40 as well as to the base of a transistor 42. It will be seen that the switch 41 as well as the emitter of transistor 42 are also connected to the positive conductor 11 while the collector of transistor 42 is connected through an electromagnetic solenoid 43 to the negative conductor 12. In the manner which is well known in the art when the solenoid 43 is energized the trailing shutter curtain will be released for closing the shutter and terminating the exposure.

As will be apparent from the description above, the voltage appearing between the slider of the variable resistor 36 and the collector of the transistor $Qw_2$ is the same as that appearing at the meter connected to the slider of the potentiometer of FIG. 13 and corresponds to an intermediate value of the brightness range providing required information with respect to proper exposure. This latter voltage is stored through the normally closed contacts *e*, *f* in the memory capacitor 38.

During operation of the shutter the change-over switch 37 is automatically changed over in order to connect the memory capacitor with the above voltage stored therein to the normally open contacts *g*, *h*, so that the stored voltage will now be superimposed upon a signal representative of the minimum brightness which is applied to the base of transistor $Qw_2$, to achieve in this way a signal representative of the intermediate brightness for proper exposure, this signal being in turn applied to the gate of FET 39.

This signal voltage of course varies at equal intervals according to an arithmetic progression because of the use of the diodes as desscribed above, and therefore it is necessary to again expand or extend this value to achieve a signal matching the original signal which varies in a series of multiples according to a geometric progression so that in this way the signal may be used properly for control of the shutter time. This change from a signal varying according to an arithmetic progression to a signal varying according to a geometric progression is achieved by utilizing the non-linear characteristic of FET 39.

In response to depression of the shutter-tripping plunger of the camera, in a well known manner the leading curtain of the shutter is released in order to open the shutter and simultaneously the normally closed switch 41 is opened so that the timing capacitor 40 begins to be charged with the current which is determined by the internal resistance of FET 39. When a predetermined level of the stored voltage is reached, or in other words after a predetermined time has elapsed, the electromagnetic solenoid 43 is energized through the transistor 42 and the trailing curtain of the shutter is released so that it can be driven to the shutter-closing position, thus terminating the exposure.

Thus, the arrangement of FIG. 12 is of great value in connection with practical photography operations since it is possible for the electric shutter control voltage to be determined based upon a complete set of exposure-determining factors required for achieving a proper photograph with the appropriate exposure time being automatically determined in a manner entirely consistent with the particular density curve of the film which is exposed.

Figure 14:
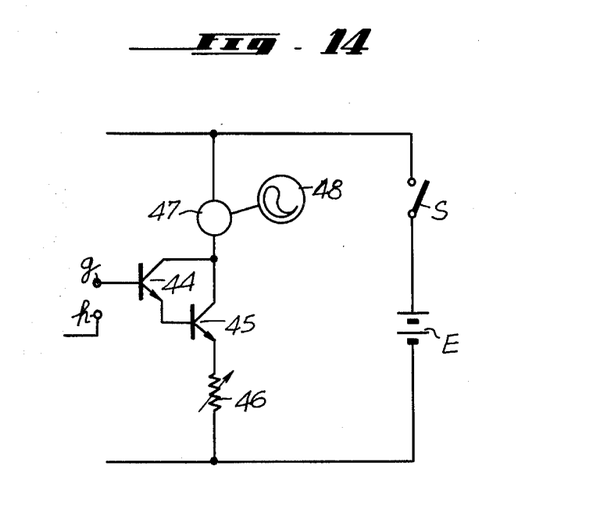
FIG. 14 is a fragmentary wiring diagram showing a variation of the embodiment of FIG. 12 according to which the diaphragm of a camera is automatically set rather than the shutter.

As has been indicated above, it is possible to determine automatically the setting of the diaphragm rather than the exposure time, and FIG. 14 fragmentarily illustates a variation of FIG. 12 which will achieve this result. Thus it will be seen that with the arrangement of FIG. 14 the intermediate brightness signal is effectively utilized for automatic control of a camera diaphragm. Specifically, the normally open contact $g$ of the switch 37 described above and shown in FIG. 12 is connected to the base of a transistor 44 which forms a Darlington circuit. The emitter of transistor 44 is connected to the base of a transistor 45 while the collectors of the transistors 44 and 45 are connected to each other and through a suitable driving motor 47 to the positive conductor. This driving motor 47 is adapted to determine the angular position of a diaphragm-control element 48 well known in the art so that through this arrangement the aperture of the diaphragm may be automatically regulated. The emitter of transistor 45 is connected through a variable resistor 46 to the negative conductor.

With this construction of FIG. 14 upon throwing of the switch 37, as in the case of FIG. 12 described above, so as to close the normally open contacts, the intermediate brightness signal is applied to the base of the transistor 44 and corresponds to the required exposure aperture provided by the diaphragm, with one of the resistors $rx$ or $ry$ having been preset to a preselected exposure time while the other variable resistor is set to a position corresponding to the speed or sensitivity of the film which is in the camera. The electric current flowing through the circuit which includes the transistors 44 and 45, to which the signal is applied, operates the drive 47 which in turn sets the diaphragm 48.

As is apparent from the above description and drawings with respect to several embodiments according to the present invention, not only maximum and minimum brightness but also an intermediate brightness therebetween may be determined in a step-by-step manner and visually read simply by a static holding of the device with respect to the object or area to be photographed. Thus it is not required to kinetically scan the object as is conventional by moving the exposure meter or camera with respect to the object which is to be photographed. As a result even when the object or area to be photographed is illuminated with an extremely uneven brightness, the extent of lack of uniformity in the illumination may be visually indicated in detail. Assuming that the device of the invention is incorporated into a photographic camera, therefore, the values from maximum to minimum brightness in connection with a particular object or area to be photographed is readily determined, even though in a discontinuous manner, while maintaining the camera stationary so that the inconvenient operation of moving the camera to detect brightness variations at the object to be photographed is eliminated and excellent results are obtained irrespective of the difficulty in obtaining a proper exposure. As a result even relatively unskilled photographers will achieve proper exposure taking into due consideration the density curve of the film which is exposed so that photographs of high quality are assured.

Moreover, with the device of the invention it is possible easily and quickly to achieve an intermediate brightness value enabling either the exposure time or the diaphragm setting to be automatically provided. This latter feature is particularly advantageous in connection with simple snapshots since the operator of the camera need not be troubled with conventional relatively complex procedures for determining the proper exposure for each photograph and thus the invention facilitates obtaining photographs of high quality. Thus with the present invention there is provided a new field for a device of the type described above and shown in the drawings.

What is claimed is:

1. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light of maximum and minimum brightness when the area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photosensitive means and the means electrically connected therewith, said changing means being manually operable for changing the reference voltage.

2. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light of maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photo-sensitive means and the means electrically connected therewith, said comparing circuit means having electrically connected with said plurality of circuits a plurality of portions which respectively include lamps each of which has an illuminated state and an extinguished state, said lamps forming part of said indicator means and said indicator means further including a graduated means connected with said reference voltage means for indicating a value when the lamp connected with the circuit which includes said one of said pair of photosensitive means changes from one to the other of said states.

3. The combination of claim 2 and wherein said graduated means is a meter.

4. The combination of claim 2 and wherein said graduated means is a scale and a pointer movable along said scale and connected with said variable resistor of said reference voltage means for moving along said scale for indicating at said scale said value when said lamp connected to said one of said pair of photosensitive means changes from one to the other of said states.

5. In a system for detecting the brightness of an area which is to photographed, a plurality of circuits respectively including a plurality of photosensitive means for respectively receiving light from different parts of the area while remaining substantially static with respect thereto with a pair of said photosensitive means respectively receiving light of maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photo-sensitive means and the means electrically connected therewith, said plurality of circuits including one set of circuits which include one of said pair of photosensitive means and another set of circuits which include the other of said pair of photosensitive means, said reference voltage means being common to and electrically connected with both of said sets of circuits and said indicator means being electrically connected with said reference voltage means for indicating both maximum and minimum illumination.

6. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light of maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photosensitive means and the means electrically connected therewith, said indicator means being electrically connected with said reference voltage means for indicating both maximum and minimum brightness, and said comparing circuit means being electrically connected with each photosensitive means for deriving from each photosensitive means either an indication of maximum brightness or an indication of minimum brightness.

7. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light or maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photosensitive means and the means electrically connected therewith, said series-connected means of each circuit is being a diode.

8. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light of maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photosensitive means and the means electrically connected therewith, said plurality of circuits including one set of circuits which include one of said pair of photosensitive means and another set of circuits which include the other of said pair of photosensitive means and another set of circuits which include the other of said pair of photosensitive means, said reference voltage means including two pairs of series-connected components each including a variable resistor and said pairs of series-connected components having therebetween junctions where said reference voltages respectively appear, and switch means for electrically connecting one of said pair of series-connected components to one of said sets of circuits and the other of said pair of series-connected components to the other of said sets of circuits, said indicator means being connected with both of said pairs of series-connected components for indicating both maximum and minimum brightness.

9. The combination of claim 8 and wherein an automatic means is electrically connected between said pairs of series-connected components for automatically setting one of a pair of exposure-determining factors of a camera which include exposure time and exposure aperture.

10. The combination of claim 9 and wherein a pair of variable resistors are electrically connected with said pairs of series-connected components for respectively setting the film speed and the other of said factors.

11. The combination of claim 8 and wherein said indicator means is also connected between said pairs of series-connected components of said reference voltage means for indicating the range between the maximum and minumum brightness.

12. The combination of claim 11 and wherein said indicator means includes a pair of meters respectively connected to said pairs of series-connected components for respectively indicating maximum and minimum brightness and a third meter connected between said pairs of series-connected components for indicating said range.

13. The combination of claim 11 and wherein said indicator means includes a graduated scale of values and said variable resistors of said pairs of series-connected components including pointers movable along said scale for indicating at said scale both maximum and minimum brightness as well as the range therebetween.

14. In a system for detecting the brightness of an area which is to be photographed, a plurality of circuits respectively including a plurality of photosensitive means for respectively receiving light from different parts of the area while remaining substantially static with respect thereto with a pair of said photosensitive means respectively receiving light of maximum and minimum brightness when said area is non-uniformly illuminated, said plurality of circuits respectively including also a plurality of means respectively connected in series with said plurality of photosensitive means for respectively providing therewith a plurality of photo-responsive divided voltages at junctions between said plurality of photosensitive means and said means electrically connected thereto, a power source, said plurality of circuits being connected in parallel with each other and with said power source, reference voltage means for providing a reference voltage and comprising a pair of series-connected components at least one of which is a variable resistor and including between said components a junction at which said reference voltage appears, said reference voltage means being connected also in parallel with said power source and with said plurality of circuits, changing means operatively connected to said variable resistor for progressively changing the resistance thereof, comparing circuit means electrically connecting said junction between said series-connected components of said reference voltage means with said junctions of said circuits for comparing said reference voltage with said plurality of photo-responsive voltages, and indicator means electrically connected with said reference voltage means for indicating when the reference voltage has a predetermined relationship with respect to the photo-responsive voltage derived from one of said pair of photosensitive means and the means electrically connected therewith, said series-connected components of said reference voltage means including a diode connected in series with said variable resistor.

* * * * *